United States Patent [19]

Yikai et al.

[11] Patent Number: 5,055,115

[45] Date of Patent: Oct. 8, 1991

[54] AIR CLEANER INCLUDING AN ELECTROSTATIC PRECIPITATOR

[75] Inventors: Kunio Yikai; Hiroaki Kanazawa, both of Tokyo, Japan

[73] Assignees: Hiroaki Kanazawa; Katsumune Shiraishi, both of Tokyo, Japan

[21] Appl. No.: 361,537

[22] Filed: Jun. 5, 1989

[30] Foreign Application Priority Data

Dec. 23, 1988 [JP] Japan ............................. 63-325439

[51] Int. Cl.⁵ .............................................. B03C 3/00
[52] U.S. Cl. ........................................ 55/124; 55/131; 55/136; 55/138; 55/152
[58] Field of Search ................. 55/124, 126, 131, 136, 55/138, 151, 152, 154

[56] References Cited

U.S. PATENT DOCUMENTS

| | | | |
|---|---|---|---|
| 1,344,330 | 6/1920 | Bradley | 55/138 |
| 2,579,445 | 12/1951 | Warburton | 55/138 |
| 3,108,865 | 10/1963 | Berly | 55/141 |
| 3,988,131 | 10/1976 | Kanazawa et al. | 55/124 |
| 4,516,991 | 5/1985 | Kawashima | 55/124 |
| 4,541,847 | 9/1985 | Oie et al. | 55/124 |
| 4,602,921 | 7/1986 | Shinohara et al. | 55/126 |

FOREIGN PATENT DOCUMENTS

| | | | |
|---|---|---|---|
| 2719035 | 11/1977 | Fed. Rep. of Germany | 55/124 |
| 52-28073 | 3/1977 | Japan | 55/154 |
| 56-78645 | 6/1981 | Japan | 55/152 |

Primary Examiner—Jay H. Woo
Assistant Examiner—C. Scott Bushey
Attorney, Agent, or Firm—Jordan and Hamburg

[57] ABSTRACT

An air cleaner has an electric precipitating apparatus that employs corona discharge and an ozone removing apparatus downstream of the precipitating apparatus. The ozone removing apparatus has a carbon filter, and is charged with a low positive voltage to remove ozone generated by the precipitating apparatus by chemical conversion to oxygen and carbon dioxide.

3 Claims, 12 Drawing Sheets

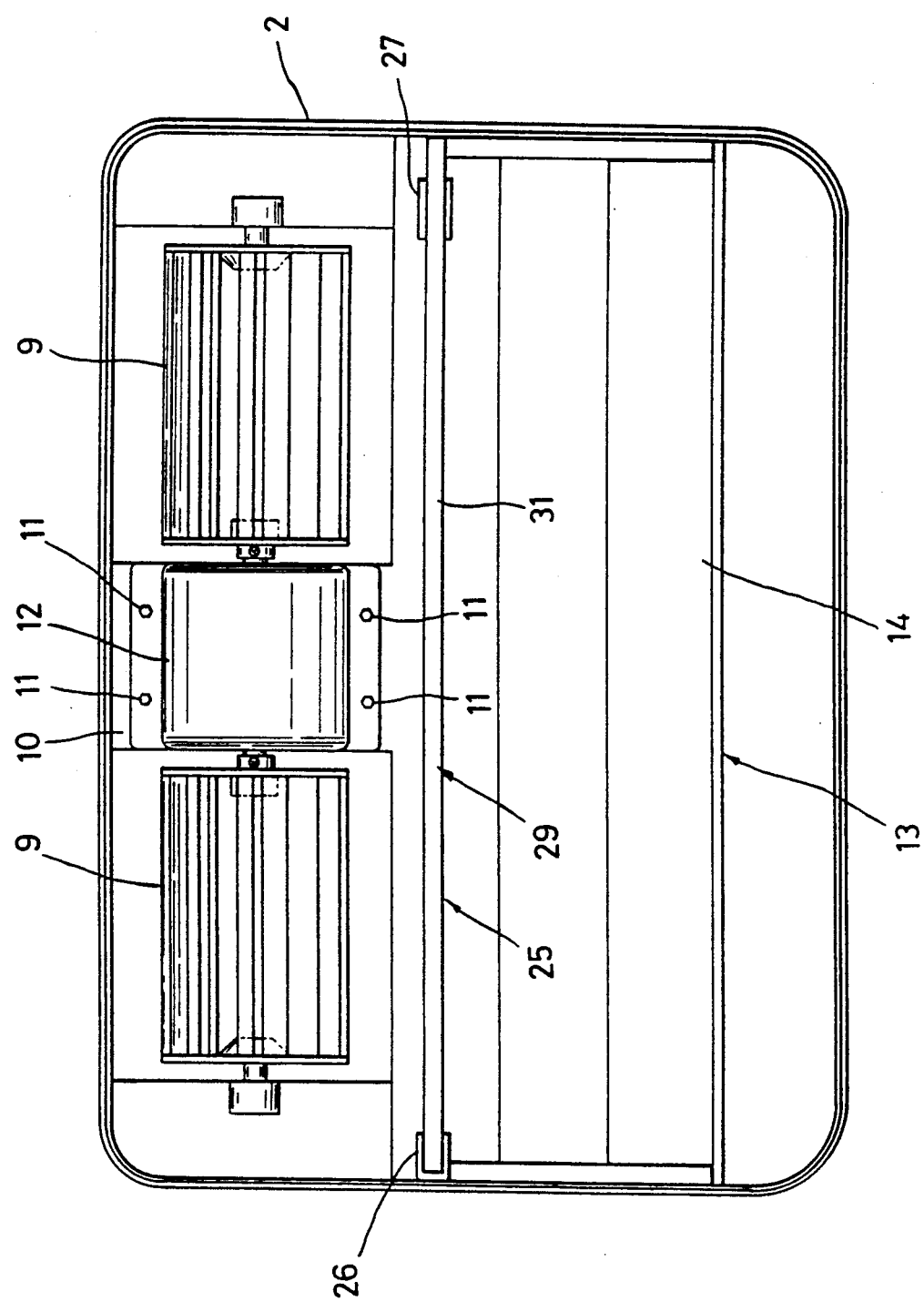

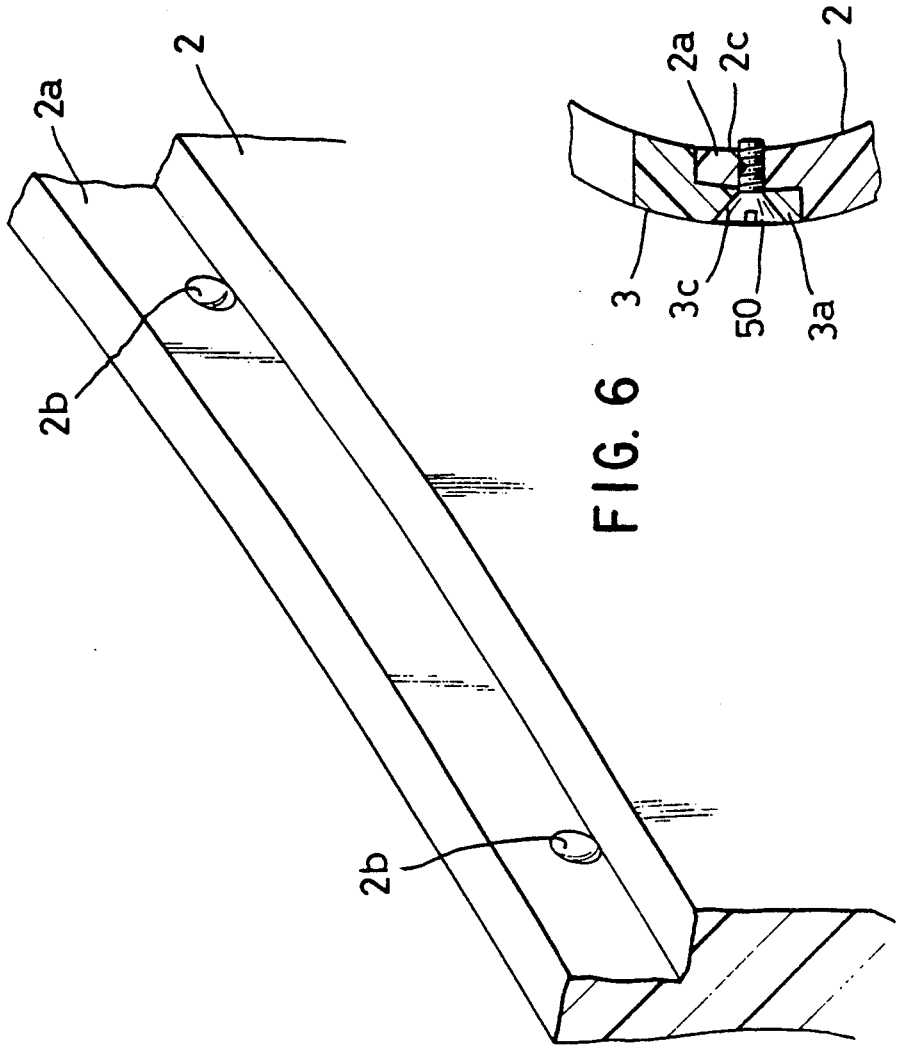
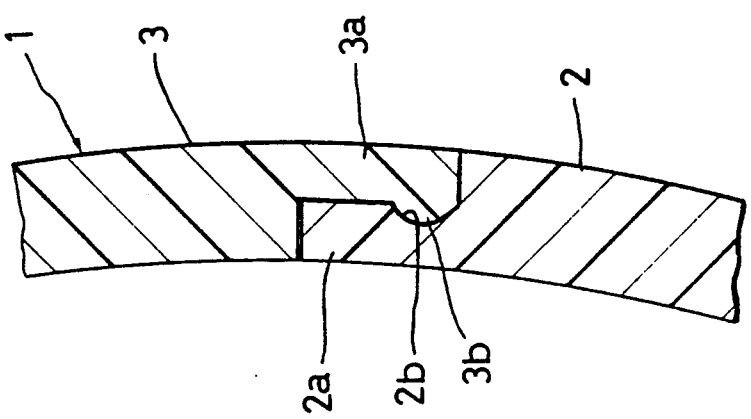

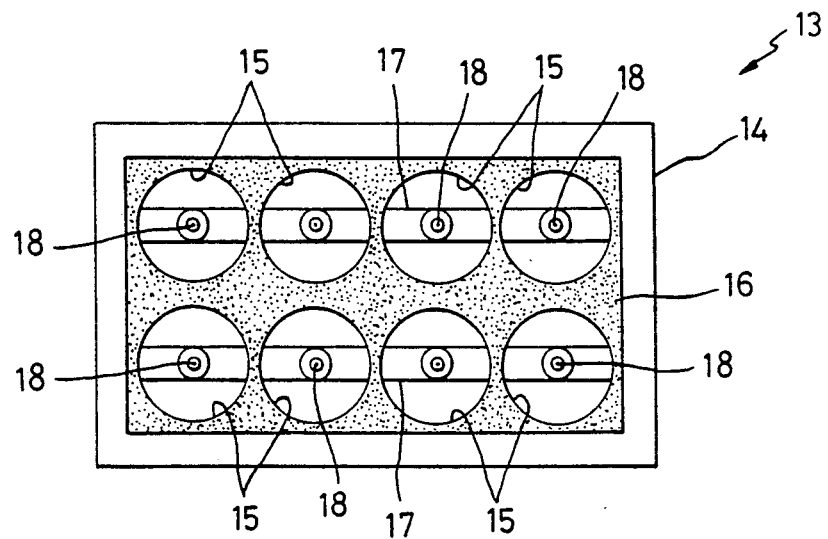
FIG. 7
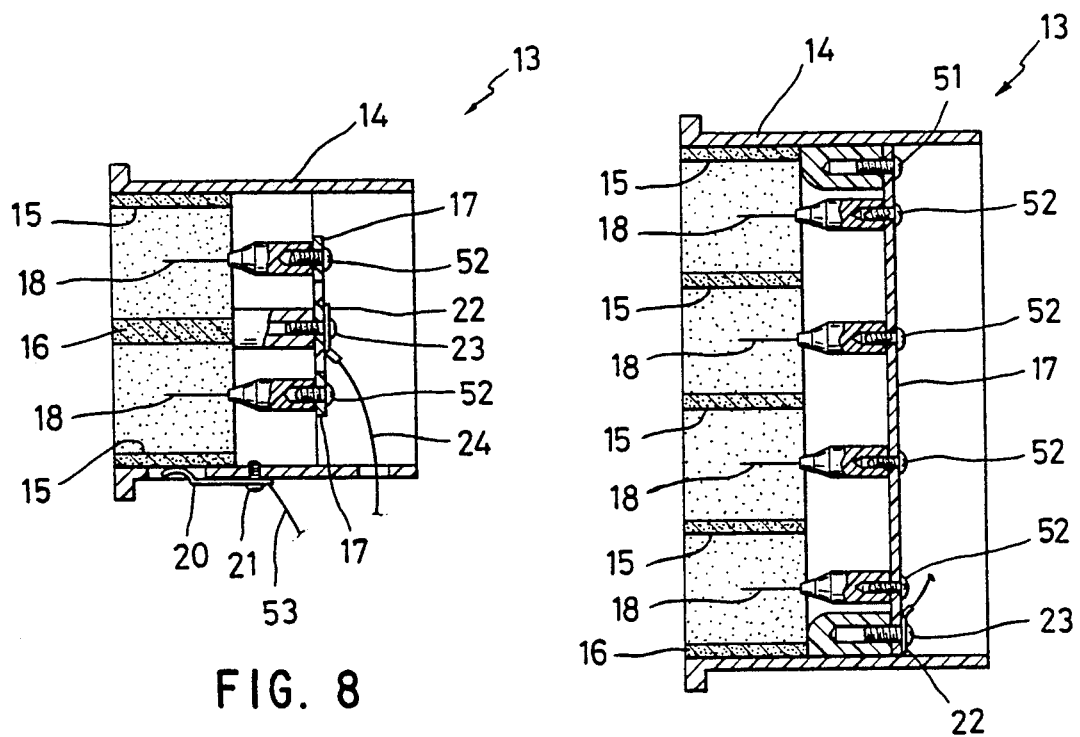
FIG. 8
FIG. 9

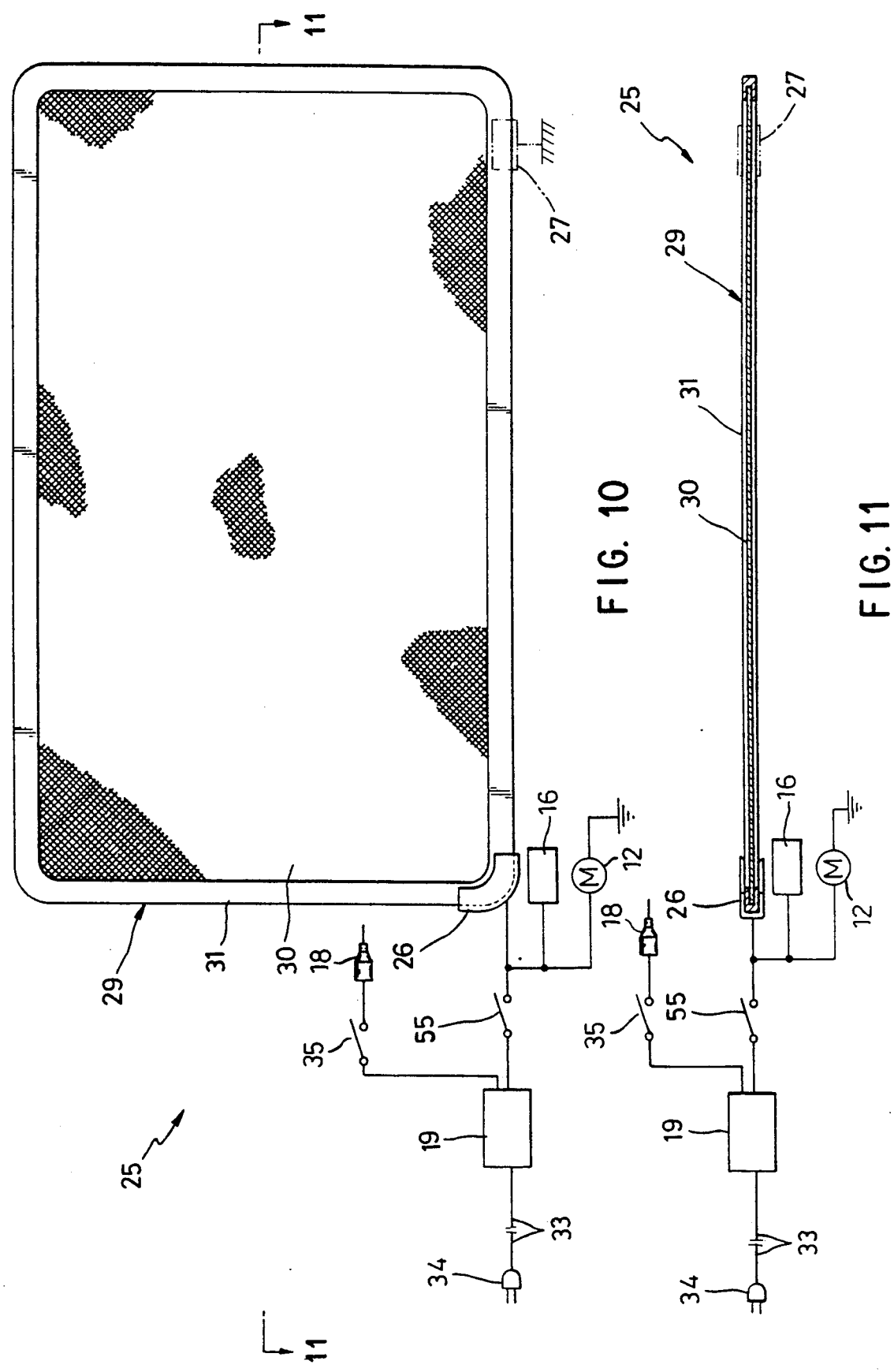

AIR CLEANER INCLUDING AN ELECTROSTATIC PRECIPITATOR

BACKGROUND OF THE INVENTION

This invention relates to an air cleaner having an electric precipitating apparatus using a corona discharge and more particularly to an air cleaner which can remove ozone generated by corona discharge and absorb a large quantity of dust in a dust collecting electrode.

Up to now, metal needles have been used for negative electrodes and metals or conductive plastics for positive electrodes for silent discharge in the electric precipitating apparatus of an air cleaner which has an electric precipitating apparatus using a corona discharge.

For this reason, dust collected to a positive electrode sticks to the surface of the electrode in course of time and the dust stuck to the positive electrode forms an insulating layer.

Accordingly, it could not keep a normal silent discharge for a long period of time because of increasing the dielectric strength between both electrodes of positive and negative. The finer such as lamp soot and the like the size of dust is, the more remarkable trend it shows. As it is usual to remove large dust by mounting a filter upstream from the electrode in the air flow because large dust has an influence on discharge itself, this fine dust is now a large obstacle in practice. Consequently, up to now the electrode member was a structure capable of being disassembled and cleaned properly by an user.

However, it had faults in that the electrode member was destroyed during disassembling or it caused an electric shock accident by disassembling it in a state of charging it with electric current.

It had another fault in that it could not be used in a closed room because it had a bad effect on the human body by generating a large quantity of ozone by making use of corona discharge of the electric precipitating apparatus.

SUMMARY OF THE INVENTION

It is the principal object of this invention to provide an air cleaner which can be used even within a room tightly closed by removing ozone generated in an electric precipitating apparatus by making use of corona discharge.

It is a further object of this invention to provide an air cleaner which is possible to keep normally with a silent discharge without cleaning the electrodes for a long time by making it possible for a large amount of fine dust to be absorbed in a positive electrode of an electric precipitating apparatus.

The above and further objects and novel features of this invention will more fully appear from the following detailed description when the same is read in connection with the accompanying drawing. It is to be expressly understood, however, that the drawing is for purpose of illustration only and is not intended as a definition of the limits of this invention.

BRIEF DESCRIPTION OF THE DRAWINGS

FIG. 3 is a plan view of the embodiment of FIG. 1 showing the state in case of removing its upper case.

FIGS. 4 and 5 are explanatory views showing the state of engagement of each engaging parts of a lower case and an upper case of the embodiment of FIG. 1.

FIG. 6 is an explanatory view of an engaging part in the lower case of the embodiment of FIG. 1.

FIGS. 7~9 inclusive are explanatory views of electrodes of an electric precipitating apparatus of the embodiment of FIG. 1.

FIG. 10 is an explanatory view of an ozone removing apparatus of the embodiment of FIG. 1.

FIG. 11 is a cross-sectional view taken on line XI—XI of FIG. 10.

DESCRIPTION OF THE PREFERRED EMBODIMENT

Figure 1:
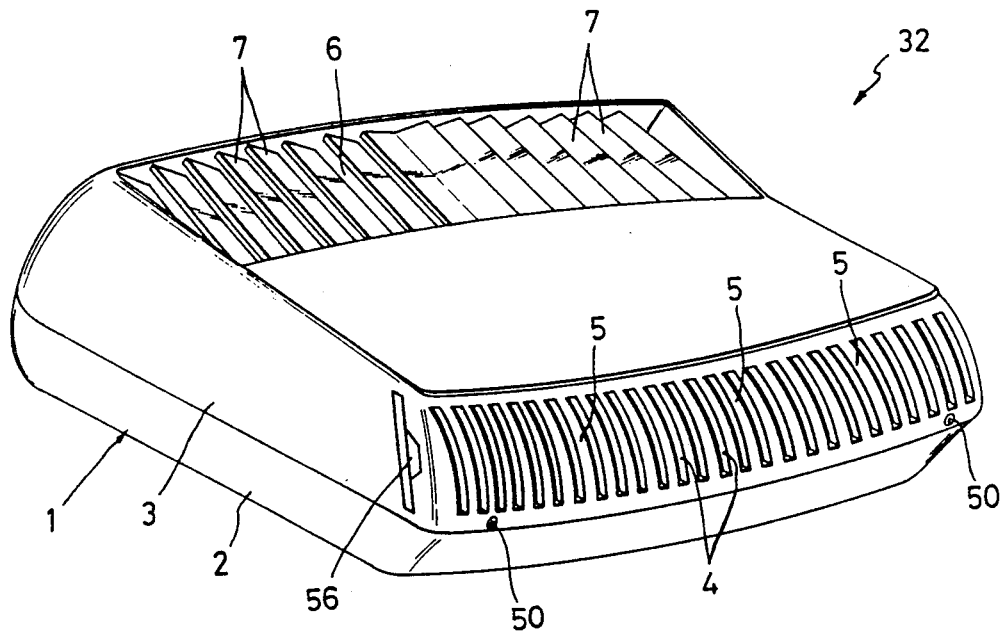
FIG. 1 is a perspective view showing an embodiment of this invention.
Figure 2:
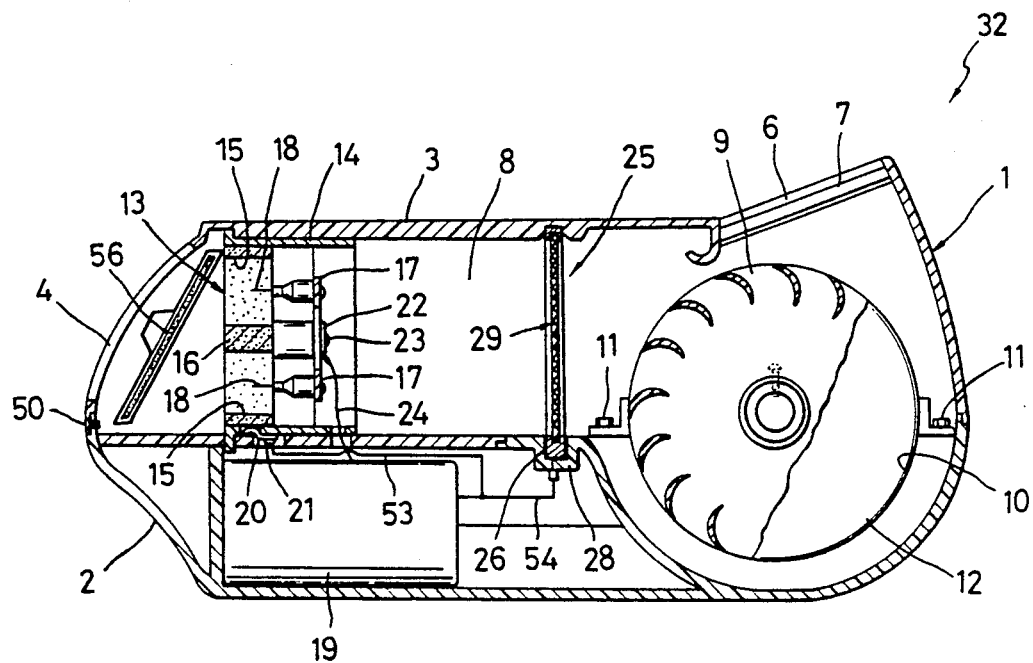
FIG. 2 is a longitudinal sectional view of the embodiment of FIG. 1.

This invention will be described in detail hereinafter with the embodiments shown in figures.

Referring first to the embodiment shown in FIGS. 1~11 inclusive, 1 indicates a case body which comprises a lower case 2 made from synthetic resin material and an upper case 3 made from synthetic resin material which is able to cover an upper opening of the lower case 2.

In a segment for engagement 2a at the upper end of the rear side of the lower case 2, 2 cavities for engagement 2b, 2b as shown in FIG. 6 are formed.

In a segment for engagement 3a at the lower end of the rear side of the upper case 3, 2 protrusions for engagement 3b, 3b which engage respectively with the cavities for engagement 2b, 2b of the lower case 2 are formed as shown in FIG. 4.

Further, in the segment for engagement 2a at the upper end of the front side of the lower case 2, 2 screw holes 2c, 2c are formed as shown in FIG. 5 and also in the segment for engagement 3a at the lower end of the front side of the upper case 3, holes 3c, 3c for inserting machine screws 50, 50 which are screwed in the screw holes 2c, 2c are formed as shown in FIG. 5.

4 indicates an air inlet having number of longitudinal bars 5 formed in front of the upper case 3.

6 indicates an air outlet having a number of fins 7 formed at the top surface of the rear side of the upper case 3.

8 indicates an air path formed within the case body 1 for communication from the air inlet 4 to the air outlet 6.

9,9 indicate fans mounted within the air path 8 near the air outlet 6 as shown in FIG. 3.

The fans 9,9 are mounted to be driven by an electric motor 12 secured by means of plural number of bolts 11 to a motor mount 10 in the nearly central part of the lower case 2.

13 indicates an electric precipitating apparatus using corona discharge in order to remove dust in the air flowing within the air path 8. The electric precipitating apparatus 13 comprises a case body 14 made from insulating material installed in the upstream position of air flow of the air path 8, a dust collecting electrode 16 having a number of penetrating holes 15 installed removably within the case bode 14, bar members 17,17 made of conductive material fixed by plural number of machine screws 51 to the case body 14 on the downstream side of air flow from the dust collecting electrode 16, a number of discharge electrodes 18 secured respectively by means of one machine screw 52 to each of the bar members 17.17 and projecting respectively into a number of penetrating holes 15 of the dust collecting electrode 16 to be able to keep air flow and a voltage impressing apparatus 19 which impress negative high voltage such as 4,500~6,500 volts to a number of the discharge electrodes 18 and also positive low voltage such as 6 volts, 12 volts, 24 volts, etc. for example, to the dust collecting electrode 16, as shown in FIGS. 7~9 inclusive.

The dust collecting electrode 16 is made of conductive porous material wherein dust can be absorbed and kept such as a sintered alloy, a metal combined with carbon or materials made from carbon.

20 indicates a terminal secured by means of a machine screw 21 to the case body 14 and connected to the dust collecting electrode 16. The terminal 20 is connected with a cord 53 which is connected to a positive low voltage output part of the voltage impressing apparatus 19.

22 indicates a terminal secured conductably by means of a machine screw 23 to the bar member 17. The terminal 22 is connected with a cord 24 connected to a negative high voltage output part of the voltage impressing apparatus 19.

25 indicates an ozone removing apparatus to remove ozone ($O_3$) in the air flowing within the air path 8 downstream from the dust collecting electrode 16 in the air flow. The ozone removing apparatus 25 comprises a carbon filter 29 mounted removably on a filter mount 28 formed in the lower case 2 and the upper case 3 facing to the air path 8 downstream from the dust collecting electrode 16 in the air flow, a plug socket 26 installed at the lower end of the filter mount 28 engaged and conducted by inserting the carbon filter 29 and connected through a cord 54 to the positive low voltage output part of voltage such as 6 volts, 12 volts, 24 volts, etc. of the voltage impressing apparatus 19 and a ground terminal 27 installed at the lower end of the filter mount 28 and contacted and conducted by inserting the carbon filter 29.

The carbon filter 29 comprises a filter body 30 of lattice style made of fibrous carbon or activated carbon and an outer frame 31 made of conductive metal fixed to cover the periphery of the filter body 30 and contact with the plug socket 26 and the earth terminal 27.

Further, 35 indicates a switch for impressing negative high voltage from the voltage impressing apparatus 19 to the discharge electrode 18.

55 indicates a switch for impressing positive low voltage from the voltage impressing apparatus 19 to the dust collecting electrode 16, the carbon filter 29 and the electric motor 12.

56 is a filter for removing large dust mounted in the air path 8 upstream from the electric precipitating apparatus 13 in the air flow to be removable from the side of the upper case 3.

An air cleaner 32 arranged as described is connected to a commercial electric source by inserting a plug 34 connected through a cord 33 to a voltage impressing apparatus 19 into a plug socket connected to a commercial electric source.

After that, when switches 35, 55 are on, fans 9, 9 run upon energization of an electric motor 12.

Air is sucked from an air inlet 4, passes through an air path 8 and is exhausted from an air outlet 6 by revolution of the fans 9, 9.

At this time negative high voltage from a voltage impressing apparatus 19 is impressed on a number of discharge electrodes 18 of an electric precipitating apparatus 13 and also positive low voltage from the voltage impressing apparatus 19 is impressed on a dust collecting electrode 16.

Therefore, the remaining fine dust in the air (material in suspension, oil, tobacco-smoke, etc.) passing through an electric precipitating apparatus 13 after removing large dust by a filter 56 changes to further finer negative particles by corona discharge, is adsorbed to a dust collecting electrode 16 and also is absorbed and kept within the dust collecting electrode 16 made of porous material.

On the other hand, as positive low voltage from a voltage impressing apparatus 19 is impressed also on a carbon filter 29 of an ozone removing apparatus 25, ozone ($O_3$) generated by corona discharge of an electric precipitating apparatus 13 is ionized to form negative ions, adsorbed by a carbon filter 29 efficiently, changed to oxygen ($O_2$) and carbon dioxide ($CO_2$) by chemical reaction with carbon of the carbon filter 29 and exhausted from an air outlet 6 as air from which ozone has been removed.

THE DIFFERENT EMBODIMENTS OF THE INVENTION

Now the different embodiments of this invention shown in FIGS. 12~19 inclusive will be described. Further, in the description of these embodiments, duplicate description for the components identical to the components of the embodiments of this invention will be omitted by giving identical symbols to identical components.

Figure 12:
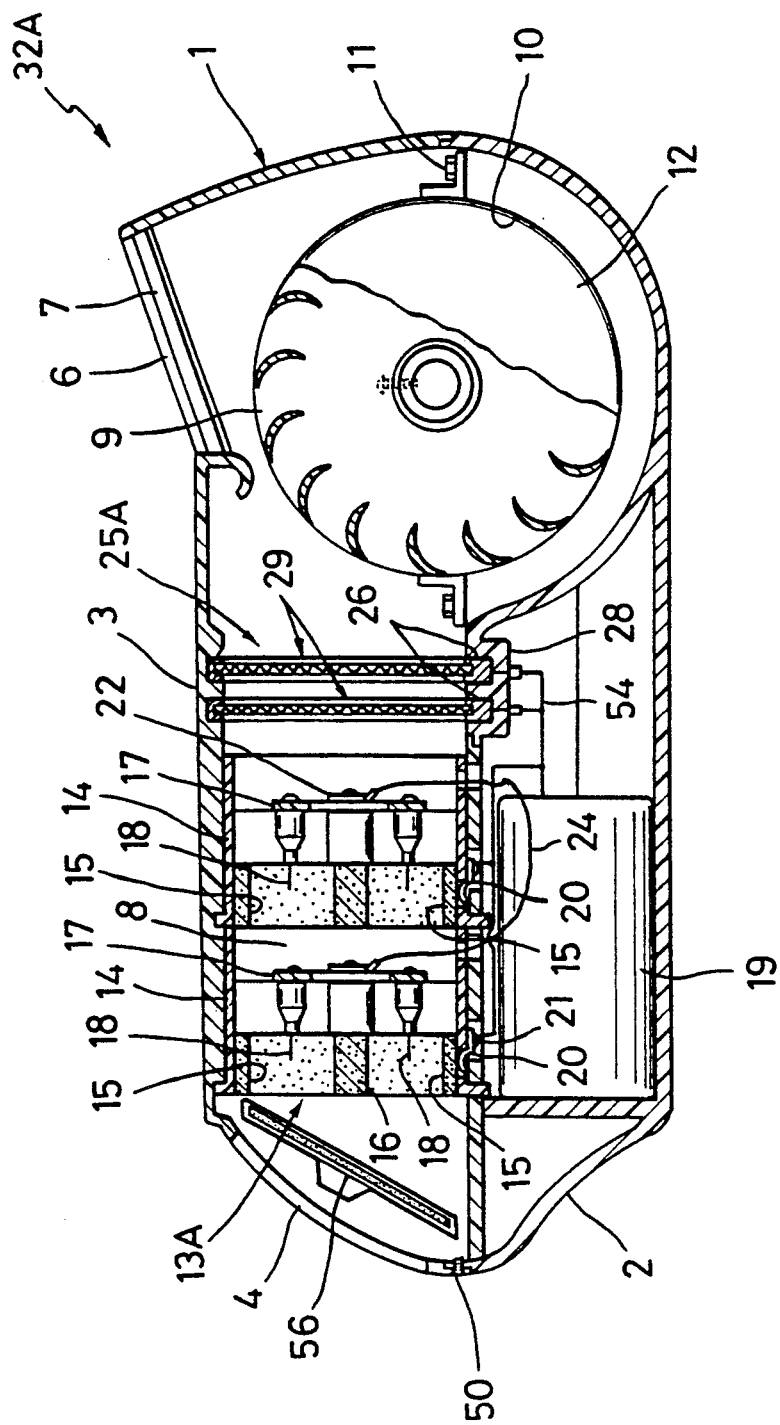
FIGS. 12 and 13, FIGS. 14~17 inclusive.
Figure 13:
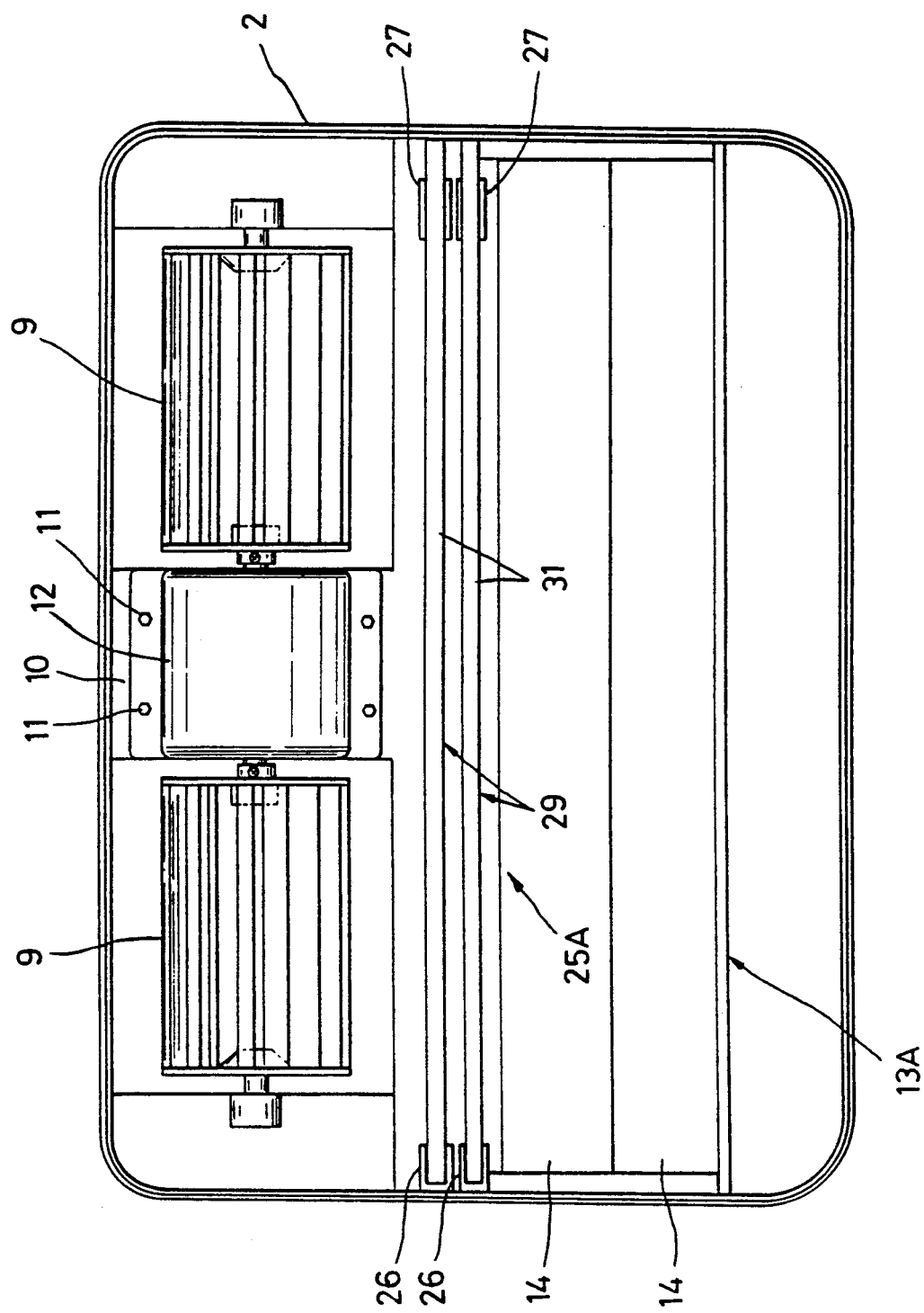
Figure 14:
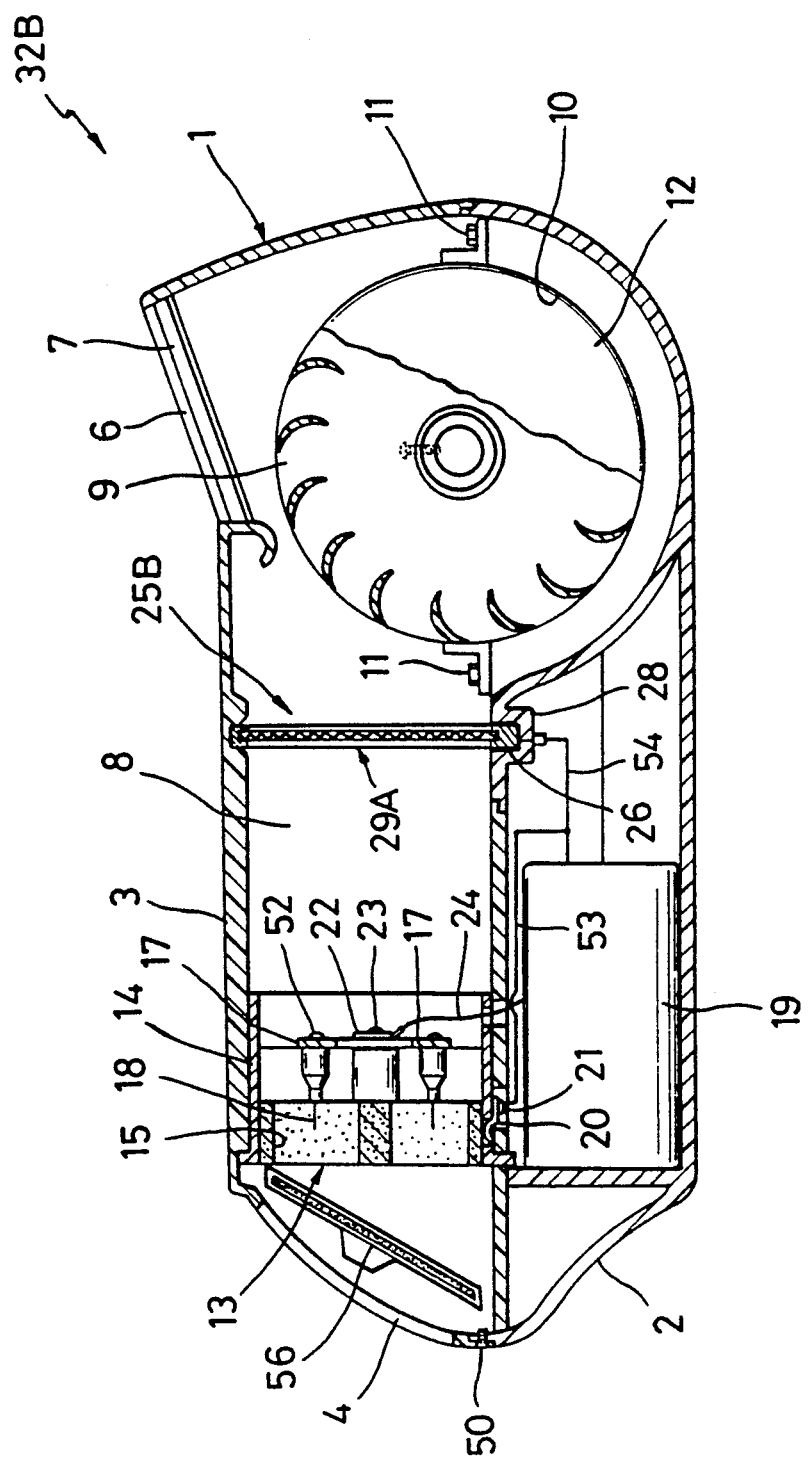
Figure 15:
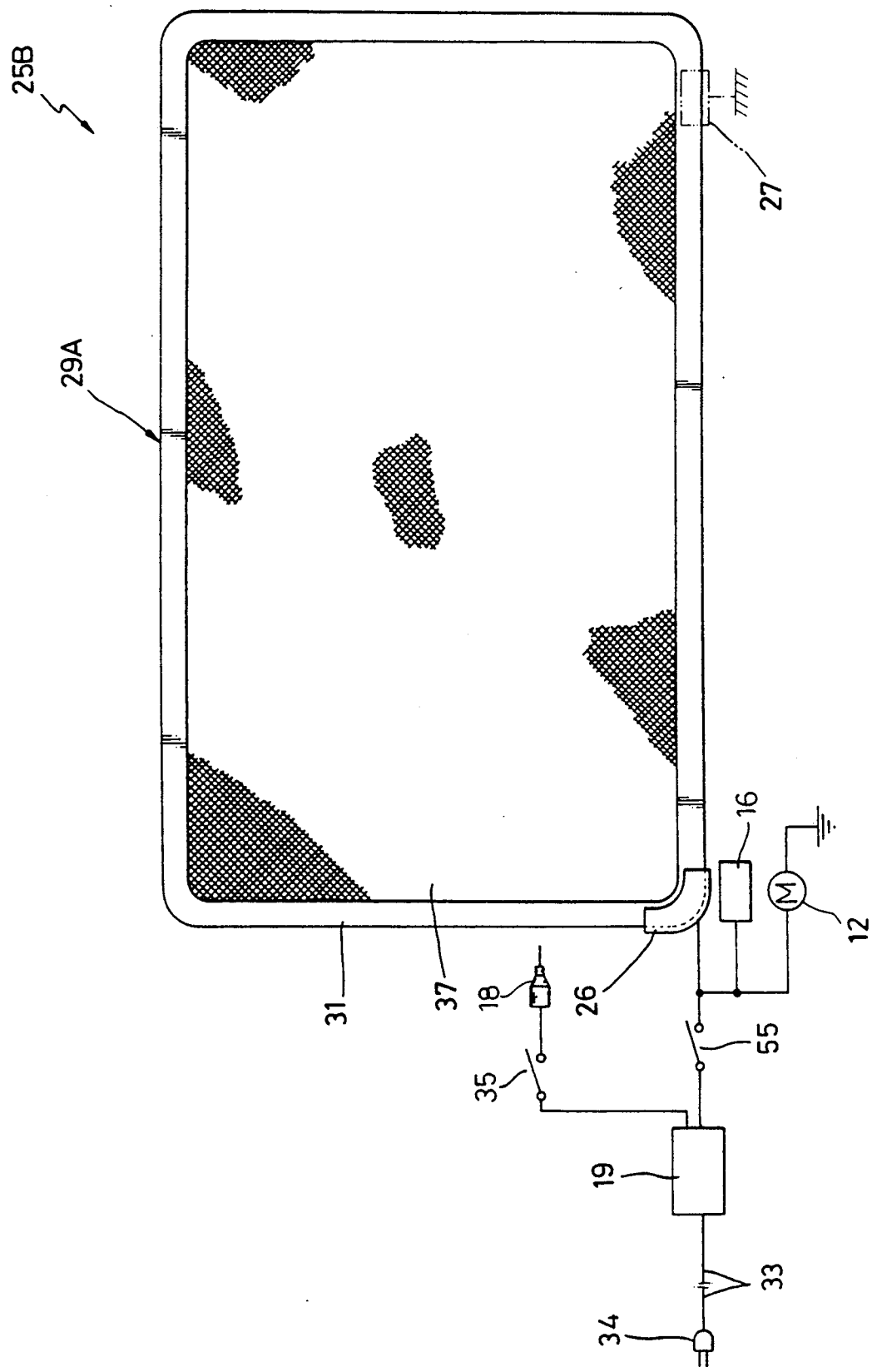
Figure 16:
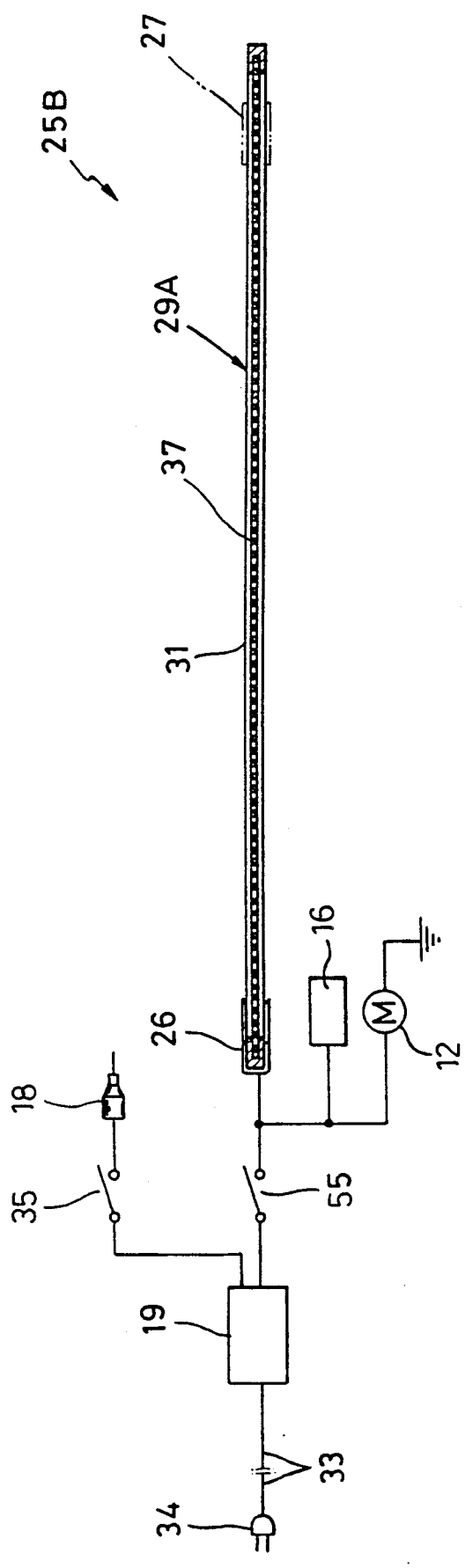
Figure 17:
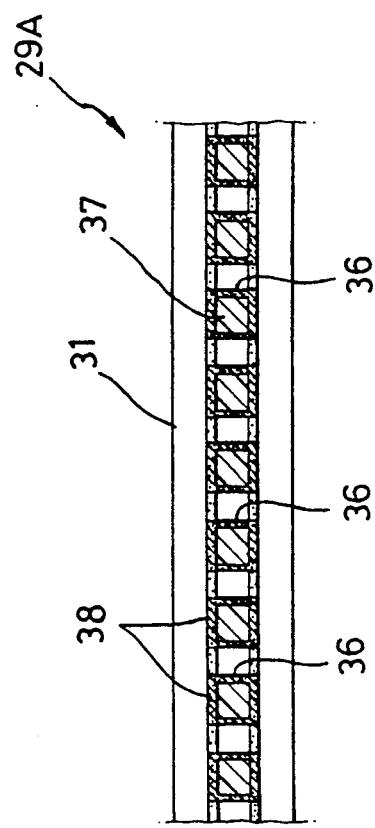

In the embodiments shown in FIGS. 12 and 13, the significant difference from the embodiments of this invention is that 2 case bodies 14, 14 each having a dust collecting electrode 16 and a number of discharge electrodes 18 are furnished in series in an air path 8 as an electric precipitating apparatus 13A and also 2 carbon filters 29, 29 are mounted in series in the air path 8 as an ozone removing apparatus 25A. It will be appreciated that it is possible to obtain the same effect even in case of an air cleaner 32A arranged as described.

In the embodiments shown in FIGS. 14~17 inclusive, the significant difference from the embodiments of this invention is in a carbon filter 29A of an ozone removing apparatus 25B. This carbon filter 29A comprises a filter body 37 made of conductive material having a number of fine holes 36 and carbon 38 fixed to cover the surface of the filter body 37.

It will be appreciated that it is possible to obtain the same effect even in case of an air cleaner 32B using the ozone removing apparatus 25B having the carbon filter 29A arranged as described.

Figure 18:
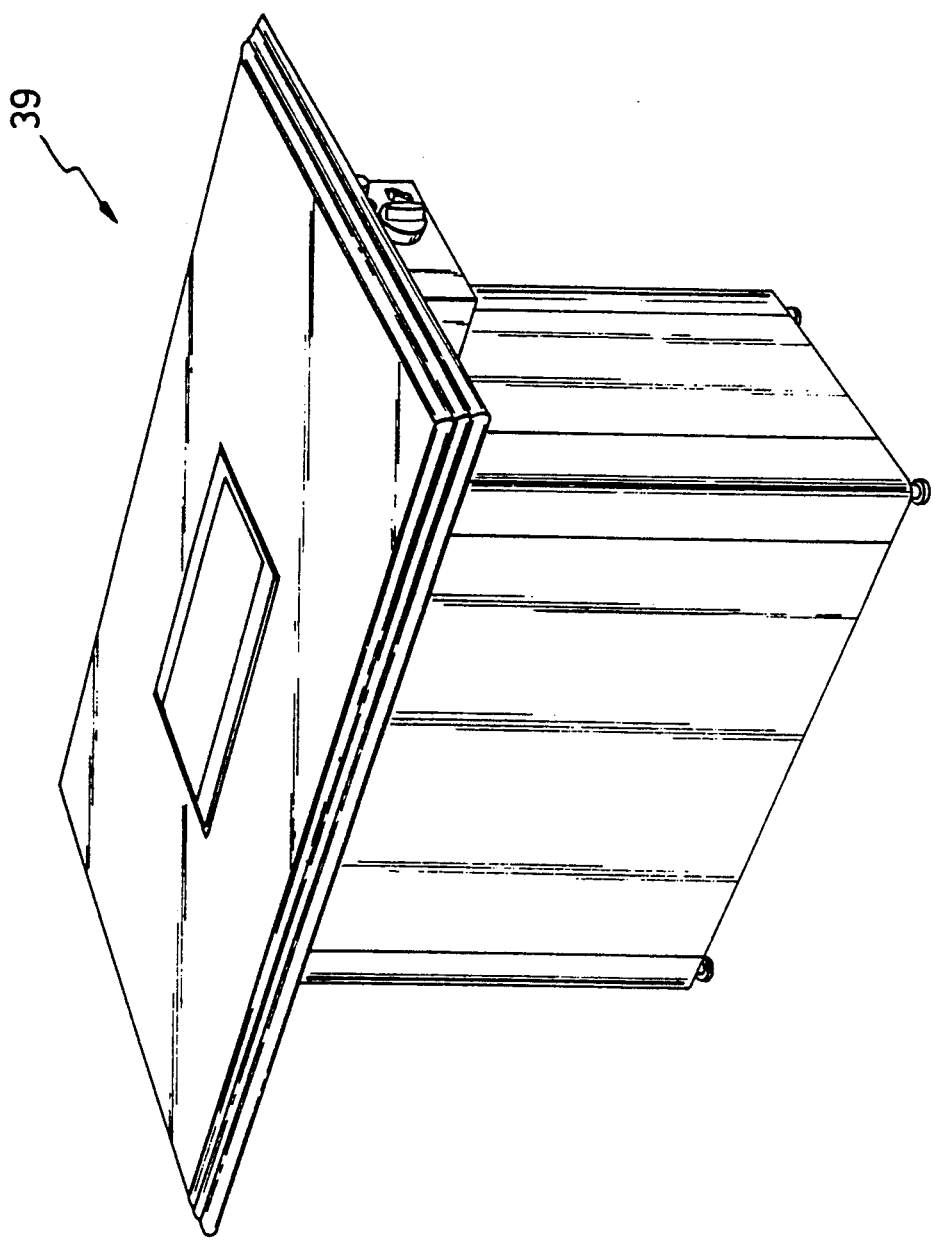
FIGS. 18 and 19 are explanatory views showing different embodiments of this invention.
Figure 19:
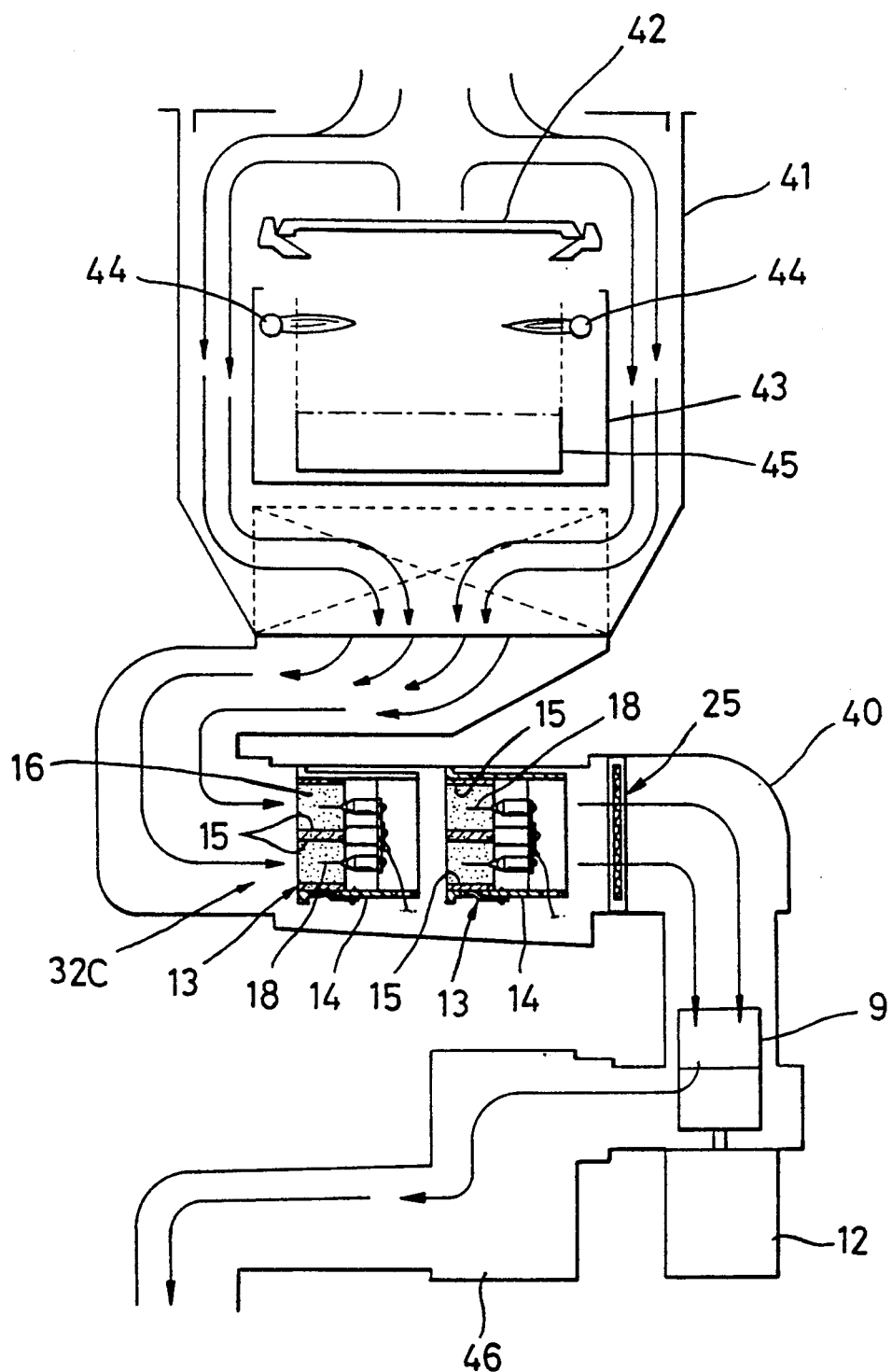

In the embodiments shown in FIGS. 18 and 19, the significant difference from the embodiments of this invention is that an air cleaner 32C is used in a duct 40 of a grilling table 39. It will be appreciated that it is possible to obtain the same effect even in case of the arrangement as described.

In this embodiment, 41 indicates a roaster, 42 a gridiron, 43 an air flow regulating box. 44 a burner, 45 a water tank and 46 a muffler.

Having described our invention as related to the embodiments in case when a dust collecting electrode has a number of penetrating holes therein, it is our intention that the invention be not limited by any of the details of description, unless otherwise specified, but the dust collecting electrode formed in the shape of ring like a circle or a square also may be used.

Further, having described our invention as related to the embodiment in case of impressing the predetermined voltage respectively to discharge electrodes 18 and a dust collecting electrode 16 of an electric precipitating apparatus 13 and a carbon filter 29 of an ozone removing apparatus 25 by one voltage impressing apparatus 19, it is our intention that the invention be not limited by any of the details of description, unless otherwise specified, but several voltage impressing apparatus may be installed for each of the above eletrodes, etc.

Further, having described our invention as related to the embodiment in case when a case body is formed to be of a horizontal type, it is our intention that the invention be not limited by any of the details of description, unless otherwise specified, but the same effect may be obtained in case when the case body is formed to be of vertical type.

Further, having described our invention as related to the embodiment in case when positive low voltage is impressed to a dust collecting electrode 16, it is our intention that the invention be not limited by any of the details of description, unless otherwise specified, but rather it is possible to collect more dust than usual in the dust collecting electrode 16 in case when the dust collecting electrode 16 is earthed without impressing positive low voltage to the dust collecting electrode 16.

THE EFFECTS OF THE INVENTION

As it is apparent from the above description, it is possible to obtain the effects of this invention as listed below:

(1) As this air cleaner comprises a case body, an air inlet formed in the case body, an air outlet formed in the case body, an air path formed in the case body for communication of the air outlet with the air inlet, one or more fans mounted within the air path in order to suck air from the air inlet and exhaust it from the air outlet, an electric precipitating apparatus by means of corona discharge mounted in the air path, an ozone removing apparatus comprising a carbon filter mounted in the air path downstream from the electric precipitating apparauts in the air flow and a voltage impressing apparatus mounted in the case body for impressing a predetermined positive low voltage to the carbon filter, it is possible to remove dust in the air by making it to be negative ionized fine particles by means of corona discharge and absorbed in a dust collecting electrode by means of the electric precipitating apparatus and also remove negative ionized ozone generated by means of corona discharge by changing it to oxygen and carbon dioxide by means of the ozone removing apparatus. Accordingly, ozone, which has a baneful infuence upon the human body, can be removed.

(2) As it is enough to remove ozone by only passing of the ozone through a carbon filter of an ozone removing apparatus for the reason described in the above item (1), it is possible to remove ozone in a short time.

(3) As ozone generated in an electric precipitating apparatus is ionized to negative ion for the reason described in the above item (1), it is possible to remove ozone to a certainty by adsorbing efficiently to a carbon filter to which positive low voltage is impressed.

(4) In an air cleaner comprising a case body, an air inlet formed in the case body, an air outlet formed in the case body, an air path formed in the case body for communication of the air outlet with the air inlet, one or more fans mounted within the air path in order to suck air from the air inlet and exhaust it from the air outlet and an electric precipitating apparatus by means of corona discharde mounted in the air path, the electric precipitating apparatus comprises a dust collecting electrode made of conductive porous material, having a number of penetrating holes, mounted within the air path, a number of discharge electrodes inserted respectively into a number of penetrating holes of the dust collecting electrode and a voltage impressing apparatus for impressing a predetermined negative high voltage to the discharge electrodes and, therefore, it is possible to absorb and keep negative ionized fine particles of dust by means of corona discharge within the dust collecting electrode. Accordingly, it is possible to use a dust collecting electrode for a long time without cleaning it and also prevent efficiently the deterioration of dust collecting efficiency to the dust collecting electrode because a large quantity of dust can be absorbed and kept within the dust collecting electrode.

(5) In an air cleaner comprising a case body, an air inlet formed in the case body, an air outlet formed in the case body, an air path formed in the case body for communication of the air outlet with the air inlet, one or more fans mounted within the air path in order to suck air from the air inlet and exhaust it from the air outlet and an electric precipitating apparatus by means of corona discharge mounted in the air path, the electric precipitating apparatus comprises a dust collecting electrode made of conductive porous material having a number of penetrating holes mounted within the air path, a number of discharge electrodes inserted respectively into a number of penetrating holes of the dust collecting electrode and a voltage impressing apparatus for impressing a predetermined negative high voltage to the discharge electrodes and also impressing a predetermined positive low voltage to the dust collecting electrode and, therefore, it is possible to absorb and keep efficiently negative ionized fine particles of dust by means of corona discharge in the dust collecting electrode as positive low voltage is impressed to the dust collecting electrode.

What is claimed is:

1. An air cleaner comprising a case body, an air inlet formed in said case body, an air outlet formed in said case body, an air path formed in said case body for communication of said air outlet with said air inlet, one or more fans mounted within said air path in order to suck air from said air inlet and exhaust it from said air outlet, an electric precipitating apparatus using corona discharge mounted in said air path and comprising a number of discharge electrodes to which a predetermined negative high voltage is impressed, and a dust collecting electrode to which a predetermined positive low voltage is impressed, an ozone removing apparatus comprising a carbon filter mounted in said air path downstream from said electric precipitating apparatus in the air flow, and a voltage impressing apparatus mounted in said case body for applying a predetermined positive low voltage to said carbon filter, whereby said carbon filter adsorbs negatively charged ozone generated in said electric precipitating apparatus and contained in air passing through said carbon filter.

2. In an air cleaner comprising a case body, an air inlet formed in said case body, an air outlet formed in said case body, an air path formed in said case body for communication of said air outlet with said air inlet, one or more fans mounted within said air path in order to suck air from said air inlet and exhaust it from said air outlet, and an electric precipitating apparatus using corona discharge and mounted in said air path, the improvement comprising an ozone removing apparatus comprising a carbon filter mounted in said air path downstream from said electric precipitating apparatus in the air flow, and a voltage impressing apparatus mounted in said case body for applying a predetermined positive low voltage to said carbon filter, said electric precipitating apparatus comprising a dust collecting electrode made of conductive porous material having a number of penetrating holes mounted within said air path, a number of discharge electrodes inserted respectively into a number of penetrating holes of said dust collecting electrode, and a voltage impressing apparatus for applying a predetermined negative high voltage to said discharge electrodes.

3. In an air cleaner comprising a case body, an air inlet formed in said case body, an air outlet formed in said case body, an air path formed in said case body for communication of said air outlet with said air inlet, one or more fans mounted within said air path in order to suck air from said air inlet and exhaust it from said air outlet and an electric precipitating apparatus using corona discharge and mounted in said air path, the improvement comprising an ozone removing apparatus comprising a carbon filter mounted in said air path downstream from said electric precipitating apparatus in the air flow and a voltage impressing apparatus mounted in said case body for applying a predetermined positive low voltage to said carbon filter and also said electric precipitating apparatus comprising a dust collecting electrode made of conductive porous material having a number of penetrating holes mounted within said air path, a number of discharge electrodes inserted respectively into a number of penetrating holes of said dust collecting electrode, and a voltage impressing apparatus for applying a predetermined negative high voltage to said discharge electrodes and also impressing a predetermined positive low voltage to said dust collecting electrode.

* * * * *